United States Patent [19]

Shigeta et al.

[11] Patent Number: 5,148,298
[45] Date of Patent: Sep. 15, 1992

[54] SPATIAL LIGHT MODULATOR

[75] Inventors: Masanobu Shigeta, Yokosuka; Shigeo Shimizu, Yokohama; Nozomu Ohkouchi; Hiromitsu Takenaka, both of Yokosuka; Toshio Konno, Hoya, all of Japan

[73] Assignee: Victor Company of Japan, Yokohama, Japan

[21] Appl. No.: 672,954

[22] Filed: Mar. 21, 1991

[30] Foreign Application Priority Data

Mar. 27, 1990 [JP] Japan .................................. 2-80364
Sep. 30, 1990 [JP] Japan ................................ 2-262619

[51] Int. Cl.⁵ .................... G02F 1/135; G02F 1/1333; G02F 1/1334
[52] U.S. Cl. ...................................... 359/72; 359/74; 359/87
[58] Field of Search .................. 350/336, 342; 359/72, 359/87, 74

[56] References Cited

U.S. PATENT DOCUMENTS

| 4,124,278 | 11/1978 | Grinberg et al. | 350/342 |
| 4,127,322 | 11/1978 | Jacobson et al. | 350/342 |
| 4,272,157 | 6/1981 | Collins. Jr. et al. | 350/342 |
| 4,432,611 | 2/1984 | Wei | 350/342 |
| 5,076,670 | 12/1991 | Sayyah | 359/72 |

FOREIGN PATENT DOCUMENTS 2329462 1/1974 Fed. Rep. of Germany ...... 350/342
1-30151 6/1989 Japan .

OTHER PUBLICATIONS

"Reflection mode spatial light modulator using polymer–dispersed liquid crystal and BSO crystal" by Takizawa et al., *Applied Physics Society*, Autumn 1989.
T. D. Beard, W. P. Bleha, and S. Wong, "ac liquid--crystal light valve" Applied Physics Letter, vol. 22, No. 3, Feb. 1, 1973.
Preprint for the 50th Meeting of the Japan Society of Applied Physics, p. 762, 3 papers 28p-ZD-5 through 7 are introduced.

*Primary Examiner*—Stanley D. Miller
*Assistant Examiner*—Anita Pellman Gross
*Attorney, Agent, or Firm*—Michael N. Meller

[57] ABSTRACT

A spatial light modulator providing an improved contrast, has a laminated structure of multiple layers including typically a photoconductive layer, an optical modulation layer, and a pair of electrode layers interposing the photoconductive and optical modulation layers. The thickness of at least one of the electrode layers having a predetermined relationship with a wavelength of light incident to the one of the electrode layers for writing or reading-out information into or from the spatial light modulator. The electrode layer may further comprise an electrode member and an intermediate layer disposed between the electrode member and an adjacent layer laminated adjacent to the one of the electrode layers, the electrode member having a first refractive index, the adjacent layer having a second refractive index, and the intermediate layer having a third refractive index determined to be in between the first and second indices, the thickness of the intermediate layer having an another predetermined relationship with the wavelength of the light incident to the one of the electrode layers for writing or reading-out information into or from the spatial light modulator. The intermediate layer may be a single layer-member or multiple layer-members having different refractive indices each other.

11 Claims, 8 Drawing Sheets

SPATIAL LIGHT MODULATOR

BACKGROUND OF THE INVENTION

The present invention relates to a spatial light modulator used in an optical arithmetic device or a video projector and, more particularly, to a spatial light modulator providing improved contrast.

Spatial light modulators (SLM) can transform incoherent light into coherent light, or vice versa. Application of spatial light modulators to parallel processing of data and to direct arithmical processing of image has been discussed. If the intensity of light can be amplified, spatial light modulators can be applied in display systems such as video projectors.

Various spatial light modulators of this kind are known as discussed in APPLIED PHYSICS LETTERS, Vol. 22, No. 3, Feb. 1, 1973, pp. 90–92, Preprint for the 50th Meeting (Autumn 1989) of the Japan Society of Applied Physics, 28P-ZD-5-7, and Japanese Patent Laid-Open No. 93519/1990.

One of such known spatial light modulators is shwon in FIG. 1, where a dielectric mirror 12 and an insulating light-blocking layer 14 are laminated on the incident side of a photomodulation layer 10, on which a writing light beam impinges. Further on the blocking layer 14 a photoconductive layer 16 is formed. A transparent electrode 18 and a glass substrate 20 are laminated in the order over the photoconductive layer 16.

On the other hand, a transparent electrode 22 and a glass substrate 24 are stacked on the side of the photomodulation layer 10 on which a reading light impinges. An appropriate driving power supply 26 is connected between the transparent electrode 18 and another transparent electrode 22.

The aforementioned photomodulation layer 10 consists of a film of a liquid crystal or a high polymer in which liquid crystalline molecules are dispersed. The dielectric mirror 12 consists either of a lamination of a titanium dioxide ($TiO_2$) film and a silicon dioxide ($SiO_2$) film or of a lamination of a silicon (Si) film and a $SiO_2$ film The light-blocking layer 14 is made from silicon (Si), germanium (Ge), boron (B), or other materials.

The photoconductive layer 16 is fabricated from hydrogenated amorphous silicon (a-Si:H), hydrogenated amorphous silicon carbide (a-SiC:H), hydrogenated amorphous silicon germanium (a-SiGe:H), crystallized bismuth silicon oxide ($Bi_{12}SiO_{20}$), or cadmium sulfide (CdS). Of these materials, a-Si:H, a-SiC:H, and a-SiGe:H are deposited as thin layers by plasma-assisted chemical vapor deposition (PCVD) or other process. CdS is deposited as a thin film by vacuum evaporation. The transparent electrodes 18 and 22 are made from indium-tin oxide (ITO) or stannic oxide ($SnO_2$).

The operation of the spatial light modulator (SLM) built as described above is now described briefly. The writing light containing desired information passes through the glass substrate 20 and the transparent electrode 18 of the device and enters the photoconductive layer 16 as indicated by the arrow F1. Electron-hole pairs are generated in the photoconductive layer 16 according to the intensity distribution of the beam of writing light. Then, these pairs are separated to form an image of electric charge corresponding to the distribution of the intensity of the writing light.

On the other hand, the reading light hits the photomodulation layer 10 as indicated by the arrow F2. However, an electric field generated by the charge image formed in the photoconductive layer 16 is applied to this photomodulation layer 10. It follows that optical modulation is achieved according to the strength of the field, thus to the intensity distribution of the writing light. The reading light modulated by the photomodulation layer 10 is reflected by the dielectric mirror 12 and leaves the device as indicated by the arrow F3.

The light-blocking layer 14 prevents the reading light passed through the dielectric mirror 12 from reaching the photoconductive layer 16; otherwise the image of electric charge would be disturbed, leading to a reduction in the contrast of the image read out.

Important figures of merit of spatial light modulators include the availability of the light and contrast ratio, as well as resolution and response. Among others, contrast ratio materially affects the performance of the device and depends much on the characteristics of the photomodulation layer 10. If contrast ratio is simply defined as the ratio of the brightness in the bright portions of the image to the brightness in the dark portions, then it follows that the contrast ratio is improved by making the bright portions as bright as possible and the dark portions as dark as possible. Where the photomodulation layer 10 exhibits good characteristics, the light intensity in the dark portions especially greatly affects the contrast ratio.

In a spatial light modulator whose photomodulation layer 10 comprises a liquid crystalline material of twisted nematic structure, the reading light is polarized light, and that component of the light reflected from the surface which has the same angle of polarization as the reading light is cut. Therefore, the availability of the light deteriorates slightly, but the contrast is hardly affected by the reading light.

However, where the photomodulation layer 10 utilizes a scattering type material such as a high polymer in which a liquid crystalline material is dispersed, the reading light is affected noticeably by the reflection at the surface. In this case, a high contrast ratio cannot be obtained.

FIG. 2 particularly shows the reflection of the reading light F2 used for the conventional structure shown in FIG. 1 in the vicinities of the surface of the SLM. Principal reflections include reflection at the surface of the glass substrate 24 (indicated by the arrow F4), reflection at the interface between the glass substrate 24 and the transparent electrode 22 due to different refractive indices (indicated by the arrow F5), and reflection at the interface between the transparent electrode 22 and the light modulator 10 due to the difference in refractive index (indicated by the arrow F6). Of these reflections, the reflection at the surface of the glass substrate 24 (indicated by the arrow F4) is generally of the order of 4%. This reflection can be suppressed to below 0.5% by forming an antireflection coating.

However, there is a possibility that the reflectivity at each surface of the transparent electrode 22 is considerably high because the refractive index of the transparent electrode 22 is as high as about 2. On the other hand, the refractive index of the glass substrate 24 is typically 1.48 ~ 1.52 and the same of the light modulator 10 made of liquid crystalline dispersed polymer mentioned previously, is typically 1.47 ~ 1.48. As an example, it is assumed that the spatial light modulator is fabricated by using the scattering type liquid crystal material which permits the dielectric mirror 12 to reflect 100% and 1% of the incident light at its maxium and minimum, respectively. If no reflection occurs at the surface indicated by the arrows F4, F5, and F6, then the maximum contrast ratio is 100:1. However, if reflection of 5% takes place at this surface, then the light intensity in the dark portions of the image increases to at least 6% (1%+5%). In this way, the contrast ratio is given by $$100:6 = 16.7:1$$

If measures are taken to prevent the reflection at the surface of the glass substrate 24, the surface reflection can be reduced by about 3.5%. In this case, the contrast ratio is improved up to 100:2.5=40:1, because the light intensity in the dark portions of the image is 1%+(5−3.5)%=2.5%. However, where the light modulator is applied to an image display, it is necessary to improve the contrast ratio by a factor of 2 or more. Hence, it is necessary to reduce the reflection at the surface further.

Such effect of light reflection occurs also on the writing side of the spatial light modulator. In particular, the reflectivity for the writing light increases, depending on the thickness of the film of the transparent electrode 18 on the writing side. This deteriotes the contrast ratio of the image or produces flare, thus leading to a reduction in there solution. In this way, undesirable phenomena take place.

SUMMARY OF THE INVENTION

It is an object of the invention to provide a spatial light modulator which reduces undesired reflection of reading light and writing light to improve the contrast ratio and the resolution of image.

In one embodiment of the invention, the spatial light modulator comprises a photoconductive member, an optical modulation member, and driving electrode members. Writing light is caused to enter the photoconductive member to write information. Reading light is made to enter the optical modulation member to read the information. The film thickness of at least one of the electrode members is determined, taking account of the wavelength of the light incident on the electrode.

In another embodiment of the invention, the spatial light modulator comprises a photoconductive member, an optical modulation member, and driving electrode members. Writing light is caused to hit the photoconductive member to write information. Reading light is made to strike the optical modulation member to read the information. At least one intermediate layer is formed between at least one of the electrode members and an adjacent member. The reflectivity of the intermediate layer is set, taking account of the refractive indices of the two adjacent layers. The thickness of the intermediate layer is determined, taking the wavelength of the light incident on the electrode member into consideration.

In accordance with the invention, the thickness of at least one of the electrode members on either side or the thickness of the intermediate layer is determined, taking the wavelength of the incident light into account. Therefore, light interference occurs when light passes through the electrode members, thereby reducing the reflection of light at the interfaces of the electrode members.

Other objects and many of the attendant advantages of the invention will become more apparent in the following description and the accompanying drawings in which like numerals refer to like parts.

DETAILED DESCRIPTION OF THE PREFERRED EMBODIMENTS

FIRST EMBODIMENT

Figure 3:
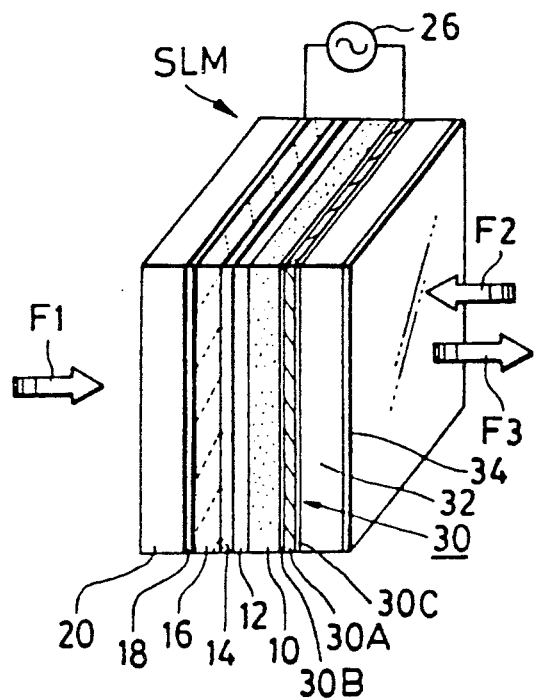
FIGS. 3 and 4 are fragmentary cross sections of a first embodiment of the spatial light modulator according to the invention.
Figure 4:
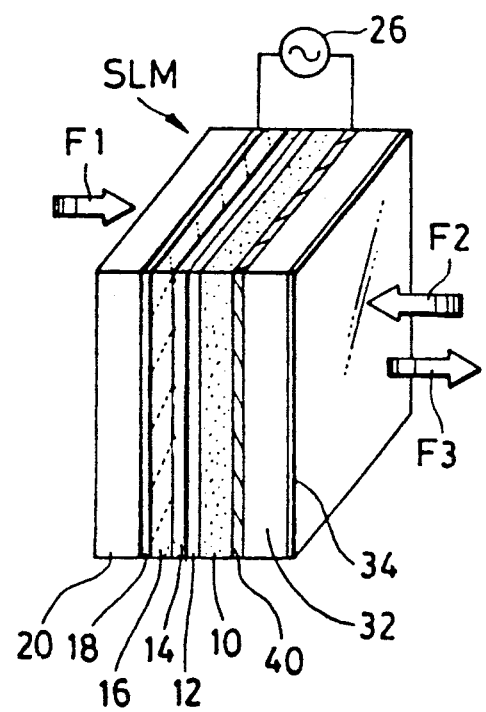
Figure 5:
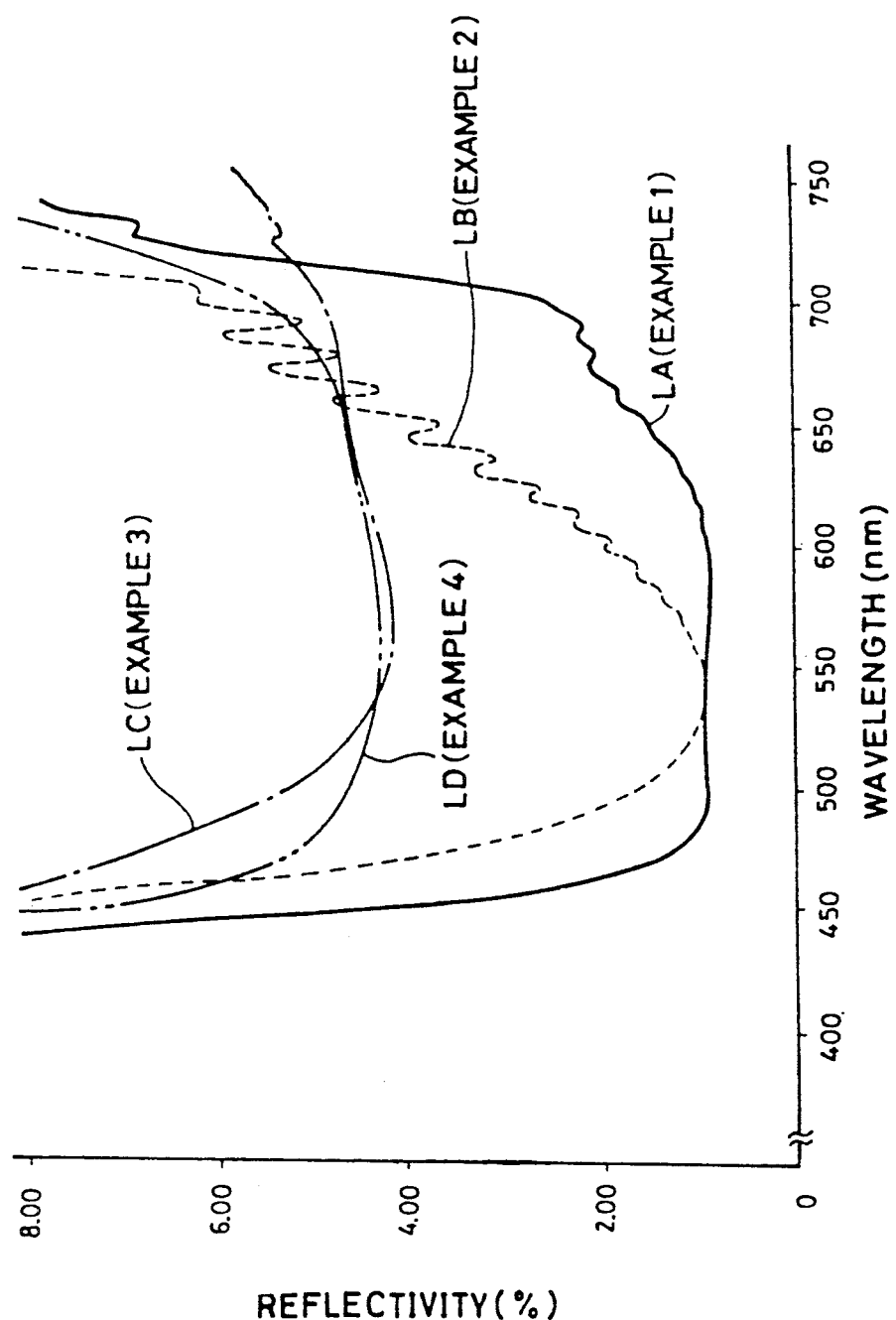
FIG. 5 is a graph in which the reflectivity of the modulator shown in FIGS. 3 and 4 is plotted against the wavelength of incident light.

A first embodiment of the invention is described by referring to FIGS. 3-5. First, this embodiment is outlined. Generally, a layer of stannic oxide ($SnO_2$) or indium-tin oxide (ITO) is used as a transparent electrode. The refractive indices of these materials are high, about 2. On the other hand, the glass substrate has an ordinary low refractive index of about 1.46 to 1.55. If the light modulators is made from a polymer in which a liquid crystal is dispersed, then the refractive index of the modulator approximates that of the glass substrate. In the present embodiment, in order to reduce the reflection at the interfaces, the optical thickness of the transparent electrode is set to $\lambda/2$, where $\lambda$ is the wavelength of the reading light. Formed between the transparent electrode and the glass substrate is an intermediate layer made from a material having a refractive index between the refractive indices of the two adjacent layers. A similar intermediate layer is formed between the transparent electrode and the photomodulation layer.

Figure 2:
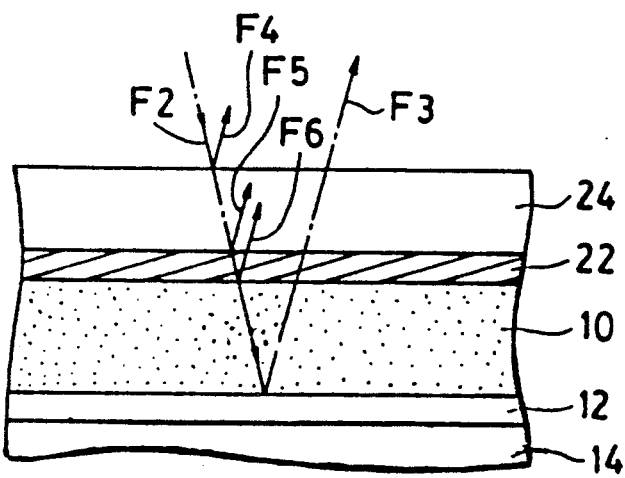
FIG. 2 is a vertical cross section of the modulator shown in FIG. 1, for showing the manner in which the reading light is reflected.

In the present embodiment, the reflection at the surface of the glass substrate indicated by the arrow F4 in FIG. 2 is reduced by an antireflection coating. Then, the reflection at the interfaces of the transparent electrode indicated by the arrows F5 and F6 in FIG. 2 is reduced by the presence of the intermediate layer. As a whole, satisfactory contrast is obtained.

Example 1 of the first embodiment is next described in detail by referring to FIG. 3. This example is similar to the foregoing conventional device except for the following points. The transparent electrode 30 on the reading side consists of an electrode layer 30A and intermediate layers 30B, 30C formed at the interfaces of the electrode layer 30A. An antireflection coating 34 is formed on the surface of the glass substrate 32. A driving voltage source 26 is connected between the transparent electrode 18 and the electrode layer 30A.

Example 1 of the construction described above was manufactured in the manner described below. With respect to the writing side of the device, the glass substrate 20 included the transparent electrode 18 made of a layer of ITO. Amorphous silicon (a-Si) was deposited as 15 μm-thick photoconductive layer 16 on the transparent electrode 18 of the glass substrate 20 by chemical vapor deposition (CVD). Silicon was deposited as 3 μm-thick light-blocking layer 14 on the surface of the photoconductive layer 16 by vacuum evaporation.

The dielectric mirror 12 was formed on this light-blocking layer 14 in the manner described now. Six layers of $SiO_2$ and six layers of $TiO_2$ were alternately grown on the light-blocking layer 14 up to the thickness of $\lambda/4$. Then, layers of $SiO_2$ were grown on these layers up to the thickness of $\lambda/2$.

With respect to the reading side of the device, an antireflection coating was formed on the surface of the glass substrate 32. For this purpose, $Al_2O_3$ was deposited as $\lambda/4$-thick intermediate layer 30C on the other surface of the glass substrate 32 by ion beam-assisted vacuum evaporation under the following conditions: the growth rate of the layer was 5 Å/sec; the temperature of the substrate was 250° C.; the degree of vacuum, or the pressure of oxygen gas, was $7 \times 10^{-5}$ Torr; and the power of the assisting ion beam using oxygen gas was 350 V, 22 mA.

Then, ITO was deposited as $\lambda/2$-thick electrode layer 30A on the intermediate layer 30C by ion beam-assisted vacuum evaporation under the following conditions: the growth rate of the layer was 1 Å/sec; the temperature of the substrate was 250° C.; the degree of vacuum (or the pressure of oxygen gas) was $4 \times 10^{-4}$ Torr; and the power of the assisting ion beam was 350 V, 22 mA.

Subsequently, $Al_2O_3$ was deposited as $\lambda/4$-thick intermediate layer 30B on the electrode layer 30A by ion beam-assisted vacuum evaporation under the same conditions as the above-described intermediate layer 30C. The refractive index of layers of $Al_2O_3$ used as the intermediate layers 30B and 30C is generally about 1.63, though the index may be affected by the method by which these layers are formed.

Desired layers were formed on the glass substrates 20 and 32 as described thus far. The photomodulation layer 10 having a thickness of 10 μm was sandwiched between these substrates 20 and 32 to form the scattering type spatial light modulator shown in FIG. 3. The photomodulation layer 10 consisted of a polymer in which a nematic liquid crystal was dispersed.

For comparison of characteristics, example 2 of the construction shown in FIG. 4 was fabricated. In this example 2, the transparent electrode 40 on the reading side consisted only of an electrode layer. ITO was grown as $\lambda/2$-thick transparent electrode 40 under the same conditions as the electrode layer 30A of example 1 described above.

Figure 1:
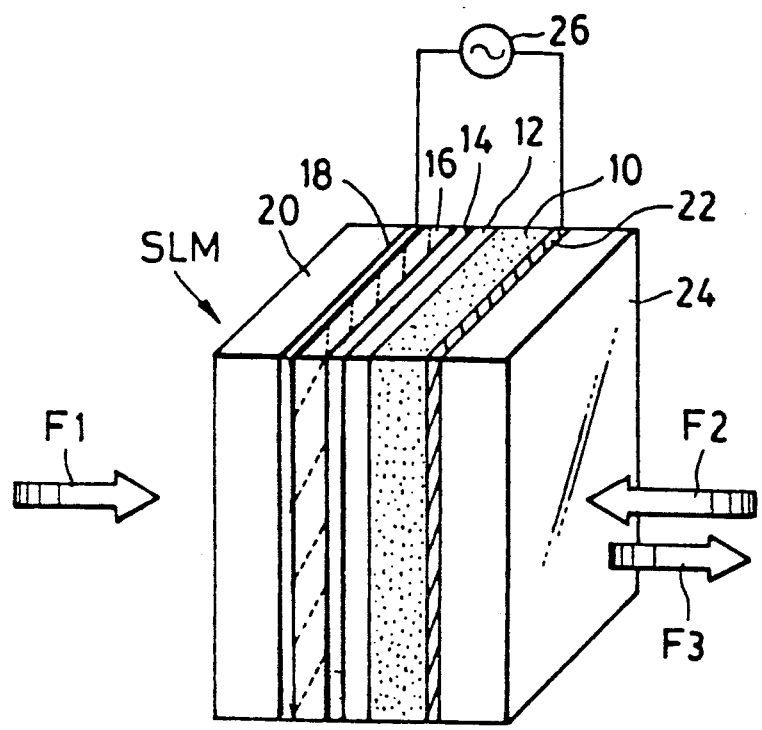
FIG. 1 is a fragmentary cross section of the prior art spatial light modulator.

Example 3 was fabricated which was similar to the prior art device shown in FIG. 1 except that the glass substrate 24 and the transparent electrode 22 on the reading side were now replaced on the example 3 with a glass substrate having a transparent electrode of ITO film thereon which is similar to the glass substrate 20 and the transparent electrode 18 found in the writing side of the prior art device in FIG. 1. Example 4 was fabricated which consisted of one glass substrate and a generally used antireflection coating formed on the substrate. This example was intended to evaluate the effect of the antireflection coating.

The characteristics of the first embodiment are next described by referring to FIG. 5 and Table 1. FIG. 5 shows the spectral characteristics of each example fabricated as described above. In particular, in the graph of FIG. 5, the reflectivity of each example is plotted against the wavelength of the incident light. The reflectivities of examples 1, 2, and 3 were measured when no voltage was applied from the driving power supply 26, i.e., under dark conditions.

With respect to the effect of the antireflection coating of example 4, the reflectivity was about 4% in the range from 450 to 700 μnm as indicated by curve LD in the graph. The reflectivity of example 3 having neither antireflection coating nor intermediate layers showed a similar characteristic as indicated by curve LC.

Example 2 (indicated by curve LB) which was similar to example 3 (indicated by curve LC) except that the antireflection coatings were formed was excellent in property around the central wavelength ($\lambda = 540$ nm) (minimum value = 0.9%). The characteristic degraded seriously and the reflectivity increased away from this central wavelength.

In contrast with these examples, example 1 of the present embodiment showed a reflectivity of about 0.9% in the wavelength range from 490 to 610 nm as indicated by curve LA. This advantage arised from the presence of the intermediate layers 30B, 30C together with the antireflection coating 34. Then reflectivity increased rapidly outside this wavelength range because of the property of the antireflection coating 34.

The contrast ratio of each example is next discussed by referring to Table 1, where the reflected light intensity ratio and the contrast ratio of each example under bright and dark conditions are listed. The dark conditions refer to the situation in which no voltage is applied to each example. The bright conditions refer to the situation in which a driving voltage is applied and an intense light beam is irradiated such that the intensity of the reflected light no longer increases, i.e., the device saturates. The intensity of the reading light incident on each example under bright and dark conditions was taken as 100%, and calculations were performed. The reading light was obtained by passing the light beam emitted by a xenon lamp through a filter with $\lambda = 550$ nm and a half-width of 100 nm.

TABLE 1

| Example No. | Reflected Light Intensity (%) Ratio under Dark Conditions | Reflected Light Intensity (%) Ratio under Bright Conditions | Contrast Ratio |
| --- | --- | --- | --- |
| Example 1 | 0.95 | 90.0 | 94.7 |
| Example 2 | 1.21 | 86.2 | 71.2 |
| Example 3 | 6.04 | 81.3 | 13.5 |

Comparison of the characteristics of example 2 with the characteristics of example 3 reveals that the presence of the antireflection coating 34 considerably improved the characteristics. As can be seen by comparing the characteristics of example 3 and 1, the characteristics were further improved greatly by forming the intermediate layer 30B, 30C in addition to the antireflection coating 34. The contrast ratio reached 94.7% [94.7(bright):1(dark)]. We consider that the intermediate layers 30B and 30C induced interference of light between the transparent electrode 30 and the photomodulation layer 10 and between the transparent electrode 30 and the glass substrate 32, respectively, thus reducing the reflected light itself.

Second Embodiment

Figure 6:
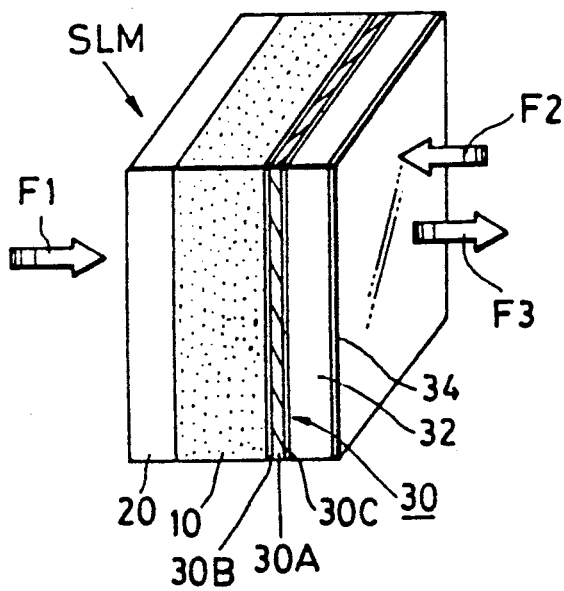
FIG. 6 is a fragmentary cross section of an example of a second embodiment of the spatial light modulator according to the invention, the example being used for measurements.
Figure 7:
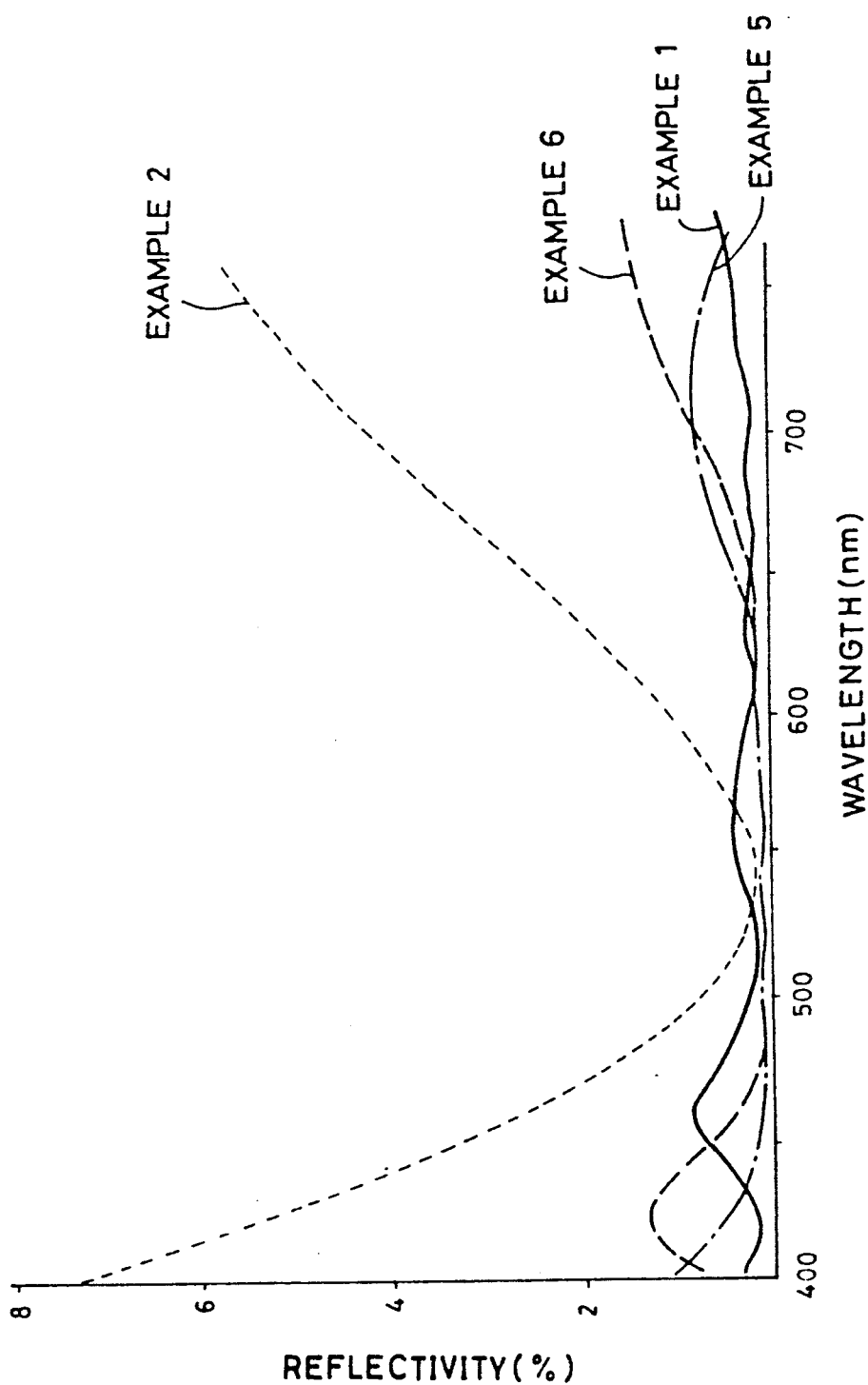
FIG. 7 is a graph in which the reflectivity of the modulator shown in FIG. 6 is plotted against the wavelength of the incident light.

A second embodiment of the invention is next described by referring to FIGS. 6 and 7. This embodiment is essentially identical in configuration with the first embodiment described already, but antireflection coating 34 used in the present embodiment is different from the counterpart of the first embodiment. The second embodiment has a cell structure as shown in FIG. 6 to permit the characteristic of the reflectivity to be measured without being affected by the light reflected from other portions, especially from the writing side. Specifically, the dielectric mirror 12, the light-blocking layer 14, the photoconductive layer 16, and the transparent electrode 18 are omitted. A cell which did not include the transparent electrode 30 was taken as a reference example, and its reflectivity characteristic was measured. Under these conditions, the characteristics of examples 1 and 2 of the first embodiment were again measured. The results are shown in FIG. 7.

Then, examples 5 and 6 were fabricated in addition to example 1. Example 5 had intermediate layers 30C and 30B similarly to example 1, but these layers were formed by evaporating $Al_2O_3$ and zirconium oxide ($ZrO_2$) from separate sources of evaporation. First, $Al_2O_3$ was deposited on the substrate 32 having the antireflection coating 34. The rate of evaporation of $Al_2O_3$ was varied continously from 10 Å/sec to 0.2 Å/sec. The rate of evaporation of $ZrO_2$ was changed continuously from 0 Å/sec to 5 Å/sec. In this way, the intermediate layer 30C having a thickness of 2500 Å was formed.

Thereafter, the electrode layer 30A was formed out of ITO under the same conditions as in example 1. $Al_2O_3$ and $ZrO_2$ were simultaneously evaporated by the aforementioned method to form the intermediate layer 30B. However, the materials were evaporated at rates changing in a reverse relation to the foregoing rates of evaporation. That is, the rate of evaporation of $Al_2O_3$ was changed from 0.2 Å/sec to 10 Å/sec, while the rate of $ZrO_2$ was varied from 5 Å/sec to 0 Å/sec. When these intermediate layers 30B and 30C were grown, the temperature of the substrate was 250° C., and the degree of vacuum was 2 to $5 \times 10^{-5}$ Torr.

Example 6 had intermediate layers 30C and 30B similarly to example 1. These intermediate layers were formed by growing magnesium oxide (MgO) and $ZrO_2$ on top of each other. First, MgO was deposited as a $\lambda/4$-thick layer on the substrate 32 having the antireflection coating 34 by vacuum evaporation. At this time, the degree of vacuum was 2 to $3 \times 10^{-5}$ Torr. Then, $ZrO_2$ was deposited as a $\lambda/2$-thick layer by oxygen ion beam-assisted evaporation. The assisting power was 450 V, 35A, and the degree of vacuum was $5 \times 10^{-5}$ Torr.

ITO was deposited as the electrode layer 30A on this intermediate layer 30C under the same conditions as in example 1. A layer of $ZrO_2$ was formed on the electrode layer 30A under the above-described conditions. A layer of MgO was formed on the layer of $ZrO_2$ under the above-described conditions. Thus, the intermediate layer 30B was obtained similarly to the intermediate layer 30C. The temperature of the substrate during the formation of the intermediate layer 30B was 250° C.

To evaluate the effect of the antireflection coating 34, example 7 was fabricated. Example 7 was similar to example 1 except that the antireflection coating 34 on the glass substrate 32 on the reading side was omitted.

The operation of the second embodiment is next described by referring to FIG. 7 and Tables 2, 3. FIG. 7 shows the results of measurements made of the reflectivities at the interfaces of the transparent electrode. As shown in this graph, the reflectivity of example 2 having neither the intermediate layer 30B nor 30C was less than 1% in the range from 480 to 590 nm but was very high outside this range. On the other hand, with respect to examples 1, 5, 6 having the intermediate layers 30B and 30C, the reflectivity was substantially less than 1% over the whole visible range. Consequently, it can be understood that the reflection of light was effectively prevented over a wide range.

The contrast ratio of each example is next discussed by referring to Table 2. Listed in Table 2 are the reflected light intensity and the contrast ratio of each example under bright and dark conditions. These conditions are the same as the conditions of the first embodiment. Calculations were made by taking the reading light incident on each example as 100%. The reading light was obtained by passing the light emitted by a xenon lamp through a filter with wavelength=550 nm and a half-width of 100 nm.

TABLE 2

| Example No. | Reflected Light Intensity (%) under Dark Conditions | Reflected Light Intensity (%) under Bright Conditions | Contrast Ratio |
| --- | --- | --- | --- |
| Example 1 | 0.95 | 90.0 | 94.7 |
| Example 2 | 1.21 | 86.2 | 71.2 |
| Example 5 | 1.11 | 89.2 | 80.4 |
| Example 6 | 0.96 | 90.1 | 93.9 |
| Example 7 | 5.01 | 88.6 | 17.7 |

Comparison of the characteristics of example 2 with the characteristics of example 1, 5, 6 shows that their contrast ratios were all high. This means that the presence of the intermediate layer effectively prevented reflection. Comparison of the characteristics of examples 1 and 7 reveals that they differ greatly in contrast ratio. This difference was created by the presence and the absence of the antireflection coating 34. Generally, the reflectivity on the surface of the glass substrate 32 is of the order of 4%. It can be seen that where no antireflection coating was formed on the surface like example 7, the antireflection coating on the side of the transparent electrode was not very effective. Sample 1, 2, 5, and 6 used the antireflection coatings having reflectivities of 0.2 to 0.5% in the wavelength range from 400 to 650 nm. Since the reflectivities at the interfaces of the transparent electrodes of examples 1 and 6 were less than 0.4% in the same range, the antireflection coating is regarded as effective.

The refractive indices of the materials of the electrode layer 30A, the intermediate layers 30B, 30C were investigated. The results are shown in Table 3 below.

The values in Table 3 suggest that refractive indices can be controlled by selecting those substances when the film thickness thereof is given. Further, when the film thickness is in the vicinity of the wavelength of light to pass, refractive index of such film can also be controlled by changing the film thickness.

TABLE 3

| Example No | Substance | Refractive index | |
|---|---|---|---|
| Example 1 | $Al_2O_3$ | 1.65 | Int. Lay. |
| Example 5 | $Al_2O_3/ZrO_2$ | 1.62–1.95 varies continuously | |
| Example 6 | MgO ZrO$_2$ | 1.73 2.10 | |
| Examples 1, 2, 5, 6, 7 | ITO | 1.99 | Elect. Lay. |

With respect to example 1 of the first embodiment, the reflectivity at the interfaces was reduced by interference of light and a high contrast ratio was achieved by fabricating the intermediate layers 30B and 30C out of materials having refractive indices between the refractive indices of the adjacent layers including the electrode layer 30A and by making the thicknesses of the intermediate layers optimal.

With respect to example 5, a similar advantage was obtained by forming these layers such that the refractive index of each intermediate layer varied continuously between the adjacent layers.

With respect to example 6, a similar advantage was derived by fabricating the two intermediate layers out of materials having refractive indices higher and lower, respectively, than the refractive index of the electrode layer 30A.

In the second embodiment, the mean refractive indices of the intermediate layers 30B and 30C should be determined to be in between the refractive index of the electrode layer 30A and the refractive indices of the adjacent layers 10 and 32.

Third Embodiment

Figure 8:
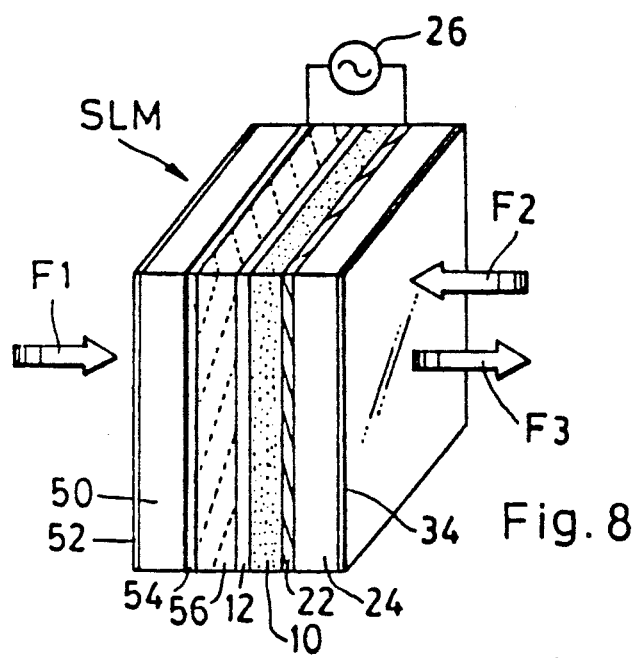
FIGS. 8 and 9(a-d) are fragmentary cross sections of a third embodiment of the spatial light modulator according to the invention.
Figure 9A:
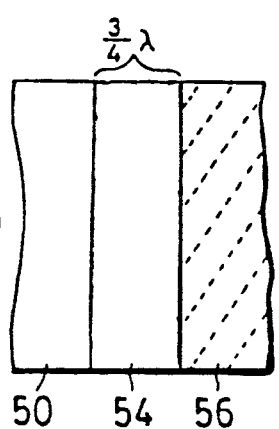
Figure 9B:
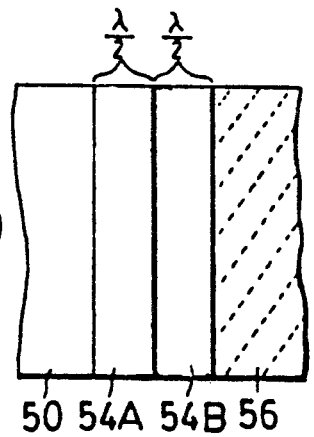
Figure 9C:
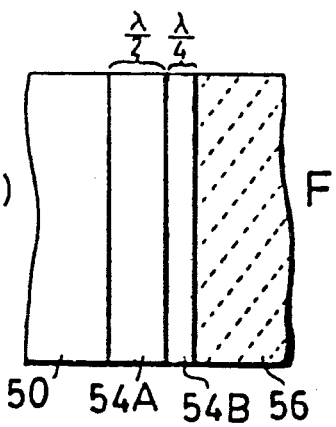
Figure 9D:
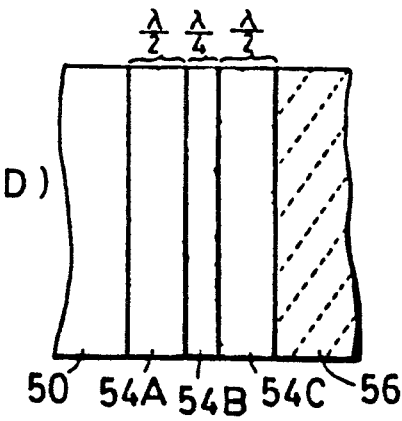
Figure 10:
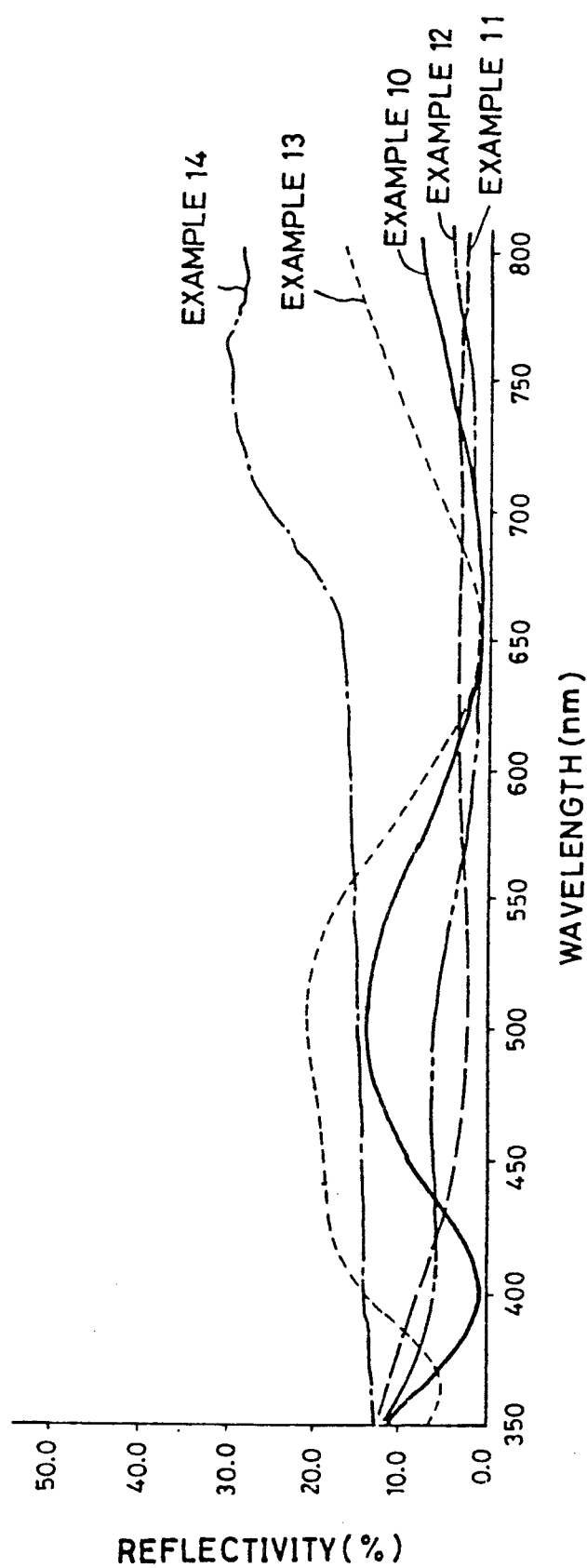
FIG. 10 is a graph in which the reflectivity of the modulator shown in FIGS. 8 and 9 is plotted against the wavelength of the incident light.

A third embodiment of the invention is next described by referring to FIGS. 8–10. All of the embodiments described above are intended to reduce the reflection from the reading side of a spatial light modulator. The present third embodiment and a fourth embodiment (described later) are intended to reduce the reflection of light from the writing side.

FIG. 8 shows the whole structure of the third embodiment. In this embodiment, a second antireflection coating 52 is formed on a glass substrate 50 on which writing light impinges. A transparent electrode 54 on the writing side is constructed as shown in FIG. 9.

In example 10 shown in FIG. 9(A), the transparent electrode 54 was made from ITO and had an optical thickness of ($\frac{3}{4}$)$\lambda$, where $\lambda$ is the central wavelength of the writing light. In general, the transparent electrode 54 having an optical thickness of $(2n-1)\lambda/4$, where n is a natural number, brings about substantially the same effect. A photoconductive layer 56 was made from anyone of the aforementioned hydrogenated amorphous silicon (a-Si:H), hydrogenated amorphous silicon carbide (a-SiC:H), and hydrogenated amorphous silicon germanium (a-SiGe:H).

In example 11 shown in FIG. 9(B), the transparent electrode 54 consisted of an intermediate layer 54A of $Al_2O_3$ and an electrode layer 54B of ITO. Both layers 54A and 54B had the same optical thickness of $\lambda/2$. Sample 12 shown in FIG. 9(C) was similar to example 11 except that the optical thickness of the electrode layer 54B of the transparent electrode 54 was $\lambda/4$.

In example 13 shown in FIG. 9(D), the transparent electrode 54 consisted of three layers, i.e., intermediate layers 54A and 54C and an electrode layer 54B. The two intermediate layers 54A and 54C were made from $Al_2O_3$, while the electrode layer 54B was made from ITO having a thickness of $\lambda/4$. The two intermediate layers 54A and 54C had the same optical thickness of $\lambda/2$. For comparing characteristics, example 14 using a commercially available glass substrate instead of the transparent electrode 54 and the glass substrate 50 shown in FIG. 9(A) was fabricated. The glass substrate of example 14 was undercoated with $SiO_2$ and had a nonuniform layer of ITO thereon. The thickness of this layer of ITO was uneven and not optimized.

The reflection characteristics of these examples of the third embodiment are now described by referring to FIG. 10. With respect to example 10, the reflectivity droped below 1% in the vicinities of wavelength 650 nm of the writing light, as can be seen from this graph. Therefore, the writing light was efficiently transmitted to the photoconductive layer 56, thus leading to an increase in the contrast ratio of the written image. This, in turn, enhanced the contrast ratio of the image read out. In addition, multiple reflections occurring between the glass substrate 50 and the transparent electrode 54 was reduced. Hence, flare which would normally be caused by the writing light was prevented. As a result, the resolution of the image was improved.

With respect to example 11, the reflectivity was below 5% at wavelengths of the writing light exceeding 450 nm. Sample 12 exhibited similar characteristics. With respect to example 13, the reflectivity was low in the vicinities of wavelength 650 nm.

On the other hand, with respect to the prior art example 14, the reflectivity was in excess of 10% over the whole range of wavelengths.

In this way, in the present embodiment, the reflection of the writing light is suppressed well as a whole. Especially, examples 10, 11, and 12 effectively prevent reflection.

Fourth Embodiment

Figure 11:
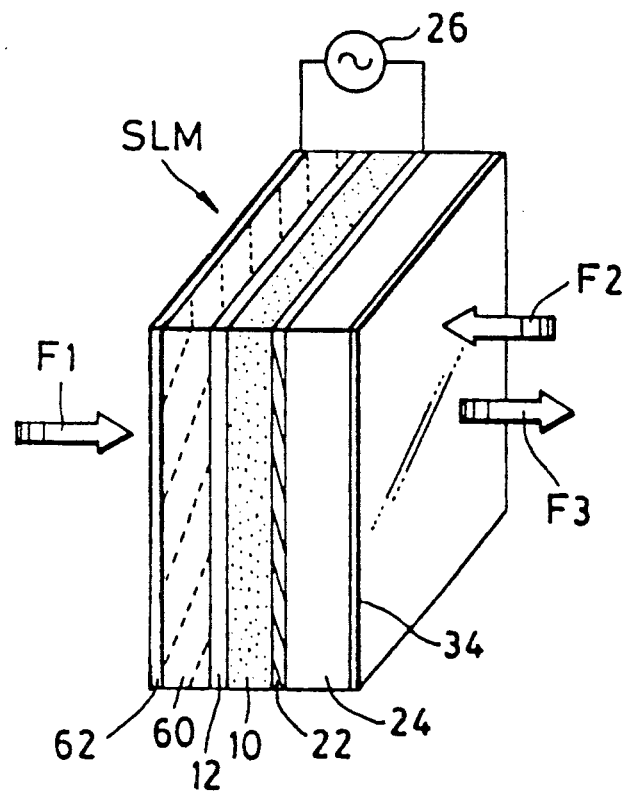
FIGS. 11 and 12(a-b) are fragmentary cross sections of a fourth embodiment of the spatial light modulator according to the invention.
Figure 12:
Figure 12:
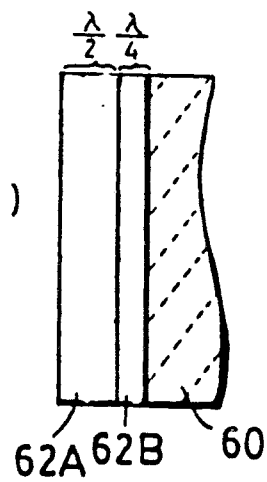
Figure 13:
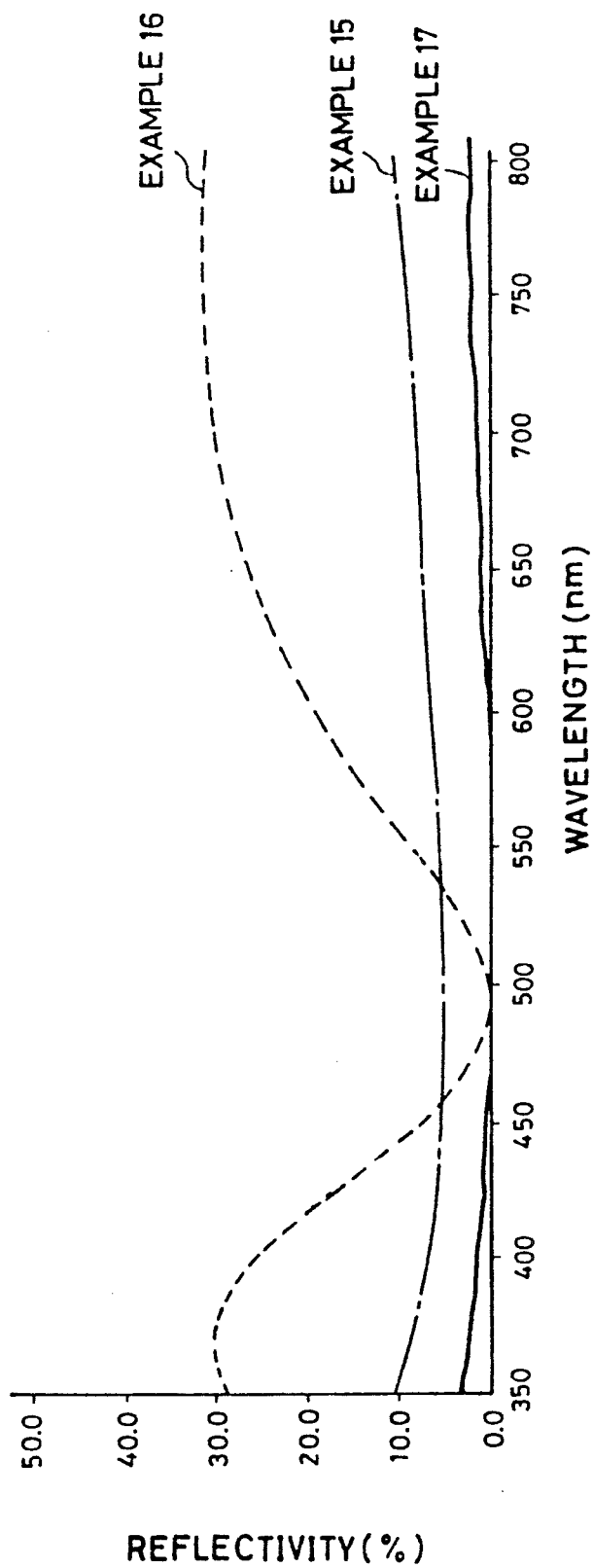
FIG. 13 is a graph in which the reflectivity of the modulator shown in FIGS. 11 and 12 is plotted against the wavelength of the incident light.

A fourth embodiment of the invention is next described by referring to FIGS. 11–13. The whole structure of the fourth embodiment is shown in FIG. 11. In this embodiment, neither a glass substrate nor an antireflection coating is formed on the writing side. A transparent electrode 62 is formed on a photoconductive layer 60 made from bismuth silicon oxide (BSO) or cadmium sulfide (CdS). The transparent electrode 62 is constructed as shown in FIG. 12.

In example 15 shown in FIG. 12(A), the photoconductive layer 60 was made from BSO. ITO was deposited as $\lambda/4$-thick transparent electrode 62 on the photoconductive layer 60. In example 16 shown in FIG. 12(B), the transparent electrode 62 consisted of an electrode layer 62B and an intermediate layer 62A of $Al_2O_3$. These layers 62A and 62B had optical thicknesses of $\lambda/2$ and $\lambda/4$, respectively. Additionally, example 17 which was similar to examples 15 except that the photoconductive layer 60 was made from CdS instead of BSO was fabricated.

The characteristics of each example of the fourth embodiment are next described by referring to FIG. 13. The reflectivity of example 15 was about 5% at wavelength 488 nm of the writing light. However, the reflectivity of example 16 was almost 0% at the same wavelength. The reflectivity of example 17 was low as a whole. Especially, it was almost 0% in the vicinities of 500 nm. This example produced good results even if the writing light was white light.

BSO responds a little to blue light but does not respond to longer wavelengths of light. Overall, BSO has lower sensitivity than a-Si:H. Therefore, the present embodiment which prevents the reflection of the writing light is effective in enhancing the contrast ratio and the resolution of the image. BSO and CdS shows reflectivities of 10–20% when no antireflection coating is formed, but the present embodiment effectively suppresses the reflection.

Other Embodiments

It is to be noted that the present invention is not restricted to the above embodiments. In many of the examples of the above embodiments, the electrode layer and one intermediate layer are made from ITO and $Al_2O_3$, respectively. These layers may be made from other materials. As an example, where the electrode layer consists of ITO, if the refractive index of the electrode layer is about 1.62, then the intermediate layer may be made from a material other than $Al_2O_3$. Where the intermediate layer is made from $Al_2O_3$, if the refractive index of the electrode layer is approximately 2.0, then the electrode layer may be made from a material other than ITO such as $SnO_2$. It is also possible to form two or more intermediate layers.

Various antireflection coatings are known. If only one layer is formed, it can be made from magnesium fluoride ($MgF_2$). If two layers are formed, then they can be made from $MgF_2$ and zinc sulfide (ZnS), respectively. If three layers are formed, they can be made from $MgF_2$, $Al_2O_3$, and $SiO_2$, respectively. Also, it is to be understood that various changes and variations may be made to the presence or absence of the light-blocking layer, the structure of the light modulator, and the materials without departing from the scope of the invention. Further, any two of the foregoing examples may be practiced in combination. For instance, reflection may be prevented on both writing and reading sides.

As described thus far, in accordance with the novel spatial light modulator, the thickness of the electrode member either on the side on which the writing light impinges or the thickness of one intermediate layer is determined, taking account of the wavelength of the incident light. Alternatively, an intermediate layer having a refractive index determined, taking the refractive indices of the neighboring layers into consideration is formed on the electrode member. In consequence, interference of light and milder variations of the refractive index effectively prevent the reflection of light from the interfaces of the electrode member, as well as flare. As a result, the contrast ratio and the resolution of the image can be improved.

What is claimed is:

1. Spatial light modulator having a laminated structure of multiple layers comprising a layer of photoconductive means, a layer of optical modulation means, a pair of first and second electrode means interposing said layers of photoconductive means and optical modulation means, the first electrode means introducing therethrough a writing light to said photoconductive means for writing information and the second electrode means introducing therethrough a reading light to said optical modulation means for reading out the information, a thickness of at least one of the first and second electrode means having a predetermined relationship with a wavelength of light which is incident to said one of the first and second electrode means;
   one of said first and second electrode means comprising an electrode layer and an intermediate layer means disposed between said electrode layer and an adjacent layer which is laminated adjacent to said one of said first and second electrode means, said electrode layer having a first refractive index, said adjacent layer having a second refractive index, and said intermediate layer means having a third refractive index determined to be in between said first and second indices, and a thickness of said intermediate layer means having an additionally predetermined relationship with the wavelength of the light incident to said one of said first and second electrode means, said intermediate layer means comprising multiple layers of intermediate layer members having different refractive indices from each other, an average of which indices is in between said first and second refractive indices.

2. Spatial light modulator having a laminated structure of multiple layers comprising:
   a photoconductive layer;
   an optical modulation layer;
   a pair of first and second electrode means interposing said photoconductive layer and said optical modulation layer; and
   a pair of first and second substrate means interposing said pair of first and second electrode means,
   said first electrode means introducing a writing light to said photoconductive layer through said first substrate means for writing information and said second electrode means introducing a reading light to said optical modulation layer through said second substrate means for reading out the information, a thickness of said second electrode means having a predetermined relationship with a wavelength of said reading light which is incident to said second electrode means, wherein said second electrode means comprises an electrode layer and an intermediate layer means disposed between said electrode layer and said second substrate means, said electrode layer having a first refractive index, said second substrate means having a second refractive index, a refractive index of said intermediate layer means being determined to be in between said first and second refractive indices, a thickness of said intermediate layer means having an additionally predetermined relationship with the wavelength of said reading light.

3. Spatial light modulator as claimed in claim 2 in which said first refractive index of said electrode layer is higher than said second refractive index of said second substrate means.

4. Spatial light modulator as claimed in claim 2, in which said intermediate layer means comprises a single layer of intermediate layer member.

5. Spatial light modulator as claimed in claim 2 in which said intermediate layer means has a refractive index ranging from 1.6 to 1.7.

6. Spatial light modulator as claimed in claim 2 in which said thickness of said intermediate layer means is $\lambda/4$ of said reading light.

7. Spatial light modulator as claimed in claim 2 in which said second electrode means further comprises another intermediate layer means disposed between said electrode layer and said optical modulation layer, a refractive index of said other intermediate layer means being determined to be in between said first refractive index of said electrode layer and a refractive index of said optical modulation layer, a thickness of said other intermediate layer means having a further predetermined relationship with the wavelength of said reading light.

8. Spatial light modulator having a laminated structure of multiple layers comprising:
   a photoconductive layer;
   an optical modulation layer;
   a pair of first and second electrode means interposing said photoconductive layer and said optical modulation layer; and
   a pair of first and second substrate means interposing said pair of first and second electrode means,
   said first electrode means introducing a writing light to said photoconductive layer through said first substrate means for writing information and said second electrode means introducing a reading light to said optical modulation layer through said second substrate means for reading out the information, a thickness of said first electrode means having a predetermined relationship with a wavelength of said writing light which is incident to said first electrode means, wherein said first electrode means comprises an electrode layer and an intermediate layer means disposed between said electrode layer and said first substrate means, said electrode layer having a first refractive index, said first substrate means having a second refractive index, a refractive index of said intermediate layer means being determined to be in between said first and second refractive indices, a thickness of said intermediate layer means having an additionally predetermined relationship with the wavelength of said writing light.

9. Spatial light modulator as claimed in claim 8 in which said first electrode means further comprises another intermediate layer means disposed between said electrode layer and said photoconductive layer, a refractive index of said other intermediate layer means being determined to be in between said first refractive index of said electrode layer and a refractive index of said photoconductive layer, a thickness of said other intermediate layer means having a further predetermined relationship with the wavelength of said writing light.

10. Spatial light modulator as claimed in claim 9 in which said other intermediate layer means is made of $Al_2O_3$ having a thickness being $\lambda/2$ of said writing light.

11. Spatial light modulator as claimed in claim 8 in which said intermediate layer means is made of $Al_2O_3$ having a thickness being $\lambda/2$ of the said writing light.

* * * * *